Jan. 13, 1931.　　　　C. G. OLSON　　　　1,788,735
SCREW AND LOCK WASHER
Filed June 11, 1928
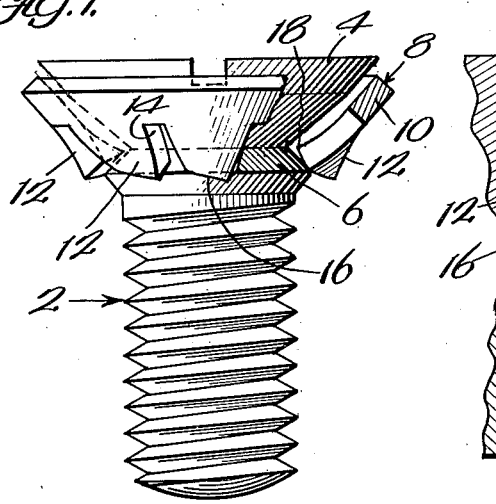
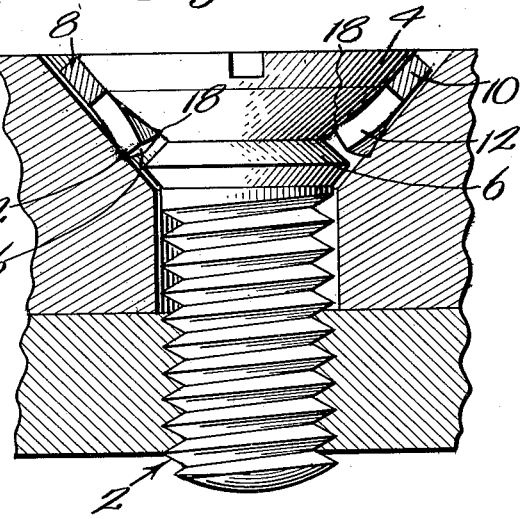
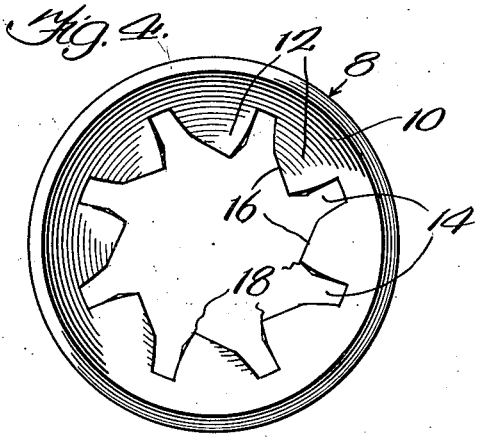
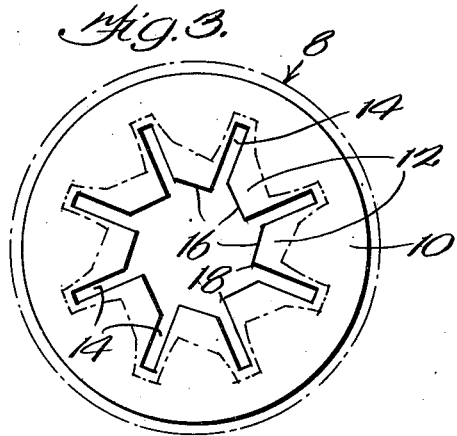
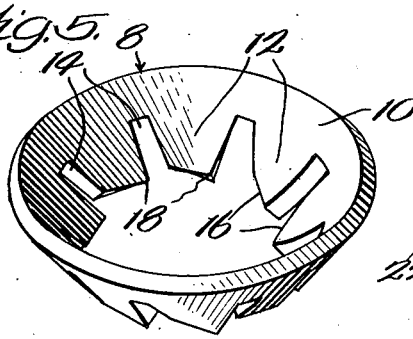
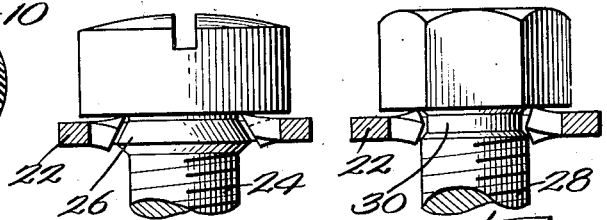
Inventor
Carl G. Olson
By Cheever & Cox, Att'ys Patented Jan. 13, 1931

1,788,735

UNITED STATES PATENT OFFICE

CARL G. OLSON, OF CHICAGO, ILLINOIS, ASSIGNOR TO SHAKEPROOF LOCK WASHER COMPANY, OF CHICAGO, ILLINOIS, A CORPORATION OF DELAWARE

SCREW AND LOCK WASHER

Application filed June 11, 1928. Serial No. 284,307.

My invention relates to a screw and lock washer construction and particularly to lock washers of the twisted prong type arranged in assembled relation with the head of a screw.

In instances where lock washers are employed beneath screw heads it has heretofore been a common practice to associate the washer with the screw just prior to the association of the screw with the work. To manually combine the washers and screws in this manner just before the screw is applied to the work requires considerable time, and one of the primary objects of my present invention is to eliminate the necessity of combining the washers with the screws at the time the screws are to be used and to this end I propose to provide screws which have lock washers permanently assembled therewith, thereby enabling screws and attached washers to be kept in stock in the same manner in which screws are now ordinarily stocked.

More specifically, my invention contemplates the provision of a screw having attached thereto a lock washer of the twisted prong type, and to retain the washer in a predetermined position upon the screw I propose to countersink the screw head, thereby presenting an abutting shoulder which will secure the washer against dislodgment from said screw head.

Another object of my present invention is to provide a lock washer which is frustoconical and which is provided with a plurality of spaced slots along the inner margin thereof, said slots being formed so as to present a plurality of spaced marginal prongs, and these prongs are twisted out of the plane of the washer.

Still another object of my present invention is to provide a frusto-conical lock washer having a plurality of twisted teeth or prongs spaced along the inner margin thereof, the inner ends of said teeth being formed angularly so as to provide a sharpened corner for the purpose of interlocking with the head of a screw and also for the purpose of facilitating the association of the lock washer with the screw.

In addition to the above mentioned advantageous characteristics, my invention more specifically contemplates the provision of a screw provided with an annular protrusion substantially at the point where the screw head and threads join, and a frusto-conical lock washer having internal twisted teeth, the diameter of the lock washer at the tooth ends being smaller than the diameter of the annular protuberance and readily adapted to be forced over and locked in position by said protuberance.

These and other objects will be more apparent from the following detailed description when considered in connection with the accompanying drawing wherein:

Fig 1 is a side elevational view of a screw and lock washer embodying features of my invention, a portion of the lock washer being broken away to more clearly disclose the arrangement of the washer teeth and the countersunk screw head;

Figure 2 discloses the screw and lock washer of Figure 1 after the screw has been applied to the work;

Figure 3 discloses the shape of the lock washer blank when it is initially cut or stamped from sheet material, and it will be noted that the inner ends of said teeth are formed angularly and dot and dash lines indicate the outline of the blank when the prongs or teeth thereof are formed so as to present a frusto-conical body;

Figure 4 discloses the dot and dash outline of Figure 3 after the prongs or teeth of said blank have been twisted;

Figure 5 is a perspective view of the complete lock washer shown in Figure 4 to more clearly illustrate the structural characteristics thereof;

Figure 6 discloses a screw and lock washer arrangement in which a flat type washer is employed, the screw being formed with an annular protuberance to secure said washer in position thereon; and Figure 7 also discloses a flat type lock washer carried by a screw, said screw being annularly countersunk to receive the inner ends of the washer teeth and thereby secure said washer in position upon said screw.

Referring now to the drawing more in detail, wherein like numerals have been employed to designate similar parts throughout the various figures, it will be seen that my invention contemplates the provision of a screw indicated generally by the numeral 2 having a frusto-conical head 4. At the point where the screw head 4 would normally join the threads of the screw, I provide an annular protuberance or shoulder 6 and this protuberance may very conveniently be formed by merely relieving or countersinking the peripheral portion of the screw head. This annular protuberance 6 provides a means for securing a frusto-conical lock washer, indicated generally by the numeral 8, in position upon the screw, as will be clearly apparent from Figures 1 and 2.

The frusto-conical lock washer 8 comprises a body portion 10 and a plurality of marginal twisted teeth or prongs 12, said prongs being separated by slots 14 as shown in Figures 3 to 5 inclusive. The inner end surfaces 16 of the teeth 12, Figure 3, are relieved or in other words formed angularly so as to present a corner 18 of increased sharpness or acuteness. By having these sharp corners 18, the interlocking effectiveness of the washer is greatly enhanced as will be more apparent from the description which is to follow. A further advantage which follows from the angular arrangement of the tooth ends 16 resides in the fact that the washer may be more easily applied to the screw head 4. This will be more apparent when it is understood that after the washer has been cut or stamped from suitable sheet material and formed into the frusto-conical body shown in Figures 4 and 5, the shank of the screw 2 must be threaded through the washer. The diameter determined by the inner ends of the washer teeth 12 is less than the diameter of the protuberance or shoulder 6 and hence in order to assemble the washer with the screw it must be forced over said protuberance. If the inner end surfaces of the margin teeth are not formed angularly, as clearly shown in Figure 3, a considerably greater portion of tooth stock would necessarily engage the annular proturberance 6 as the washer was being applied to the screw and hence considerably greater frictional resistance would be encountered in forcing the washer over the protuberance. In other words, by forming the inner ends of the teeth angular, only the corner portions 18 thereof encounter or frictionally engage the protuberance 6, and hence the washer may be slipped over said protuberance with little effort. Thus it will be apparent that the angular arrangement of the inner tooth ends not only greatly facilitates the interlocking engagement of said teeth with the screw head, but also facilitates the ease with which the washers may be assembled with the screw heads.

In Figure 1 the washer is shown in association with the screw prior to the application of the screw to the work while in Figure 2 the washer is shown in interlocking engagement between the work and the screw head after said screw had been applied to the work. It will be apparent that as the screw 2 is driven into the work in the usual manner, the sharpened corners 18 of the washer will be driven into the peripheral surface of the screw head, thereby greatly facilitating the interlocking engagement between the washer and said head. Obviously the increased sharpness of the corners 18 of the teeth resulting from the angular arrangement of the end surfaces 16 serves to increase the effectiveness of the washer in securing or locking the screw against dislodgment. It will also be understood that the threads of the screw are not mutilated when the washer is applied because the internal diameter determined by the washer teeth is slightly larger than the thread diameter and therefore do not engage said threads but only engage the annular protuberance 6.

The twisted teeth in the lock washer will more effectively interlock with the work when not completely flattened, or in other words when said teeth are not completely untwisted. To provide for this I form the portion of the screw head which engages the prongs of the washer with an angle which differs slightly from the angle of the part which bears against the body portion of the washer. Thus as a screw is tightened the outer portion of the conical surface of the screw head will bear down on the rim of the washer before the other portion of the conical surface completely flattens the prongs of the washer. Obviously this construction makes for ideal locking conditions by reason of the fact that the resilient interlocking engagement of the teeth with the work is maintained.

Referring now to Figures 6 and 7, it will be observed that I have disclosed flat type twisted tooth lock washers 22 which are similar to the type of lock washer disclosed in my co-pending application, Serial No. 257,560, filed February 28, 1928, relating to method of forming lock washers. In Figure 6, a screw or bolt 24 which is provided with an annular projection or protuberance 26 is shown. This protuberance 26 functions similarly to the protuberance 6 already described in connection with the frusto-conical washer 8 in that the washer 22 may be forced over the protuberance 26 so as to be locked or secured in position adjacent the flat under side of the bolt head as clearly shown.

In Figure 7, a bolt or screw 28 is provided with an annular recess 30 immediately adjacent the under side of the bolt head. This recess 30 is designed to receive the inner ends of the lock washer teeth and thereby retain said washer in operative position adjacent the bolt head. The internal diameter of the aperture in the washer 22 associated with the bolt or screw 28 would necessarily be slightly smaller than the outer diameter of the screw threads in order that the teeth thereof will spring into locking engagement within the recess 30. In view of the fact that the internal diameter of the washer is only slightly smaller than the thread diameter, no appreciable damage or mutilization of the thread will occur. Washers of the type disclosed in my above mentioned co-pending application are formed with abutting ends and hence permit of their being sprung sufficiently to enable the same to be passed over the threaded portion of a bolt without engaging or mutilating said threads. Thus in instances where it is desirable, lock washers of this type may be employed in connection with bolts of the type shown in Figure 7, thereby permitting said bolt to be threaded through the washer without engaging the threads thereof. The locking engagement of the teeth of the washers 24 with the work, is just as effective as the locking engagement of the teeth of the frusto-conical type washer hereinbefore described, and it will be apparent that the advantages which flow from the use of flat type washers in the manner described, will have the same effectiveness as the advantages incident to the use of the screw and conical type of lock washers.

From the foregoing it will be understood that my improved screw and lock washer construction presents a very convenient and practical arrangement. I am aware that frusto-conical types of lock washers have been employed, as for example the lock washers disclosed in the patent to C. G. Olson et al., No. 1,600,241 dated Sept. 21, 1926, and also the lock washer set forth in the patent to R. T. Hosking, No. 1,592,525, dated July 13, 1926, but my invention provides a screw and lock washer arrangement which presents structural differences and advantages which are not suggested by these patents or by any prior art constructions with which I am familiar. By having the twisted teeth or prongs arranged in spaced relationship and angularly formed at their inner ends, I have been able to greatly increase the locking effectiveness thereof and by having said washer adapted for convenient association with screw heads as described, the necessity of expending time in associating lock washers with screws immediately prior to the use of said screws has been obviated. The angular protuberance on the screws provides a convenient means for retaining the washers in assembled relation with respect to the screws, thereby enabling a supply of screws equipped with lock washers to be kept in stock for use when the occasion demands, and from the foregoing it will be clear that said lock washers may be assembled with the screws in such a manner that the threads thereof need not be subjected to the hazards of being mutilated.

Although the invention has been described in connection with screws having a particular type of head, namely a frusto-conical or flat type head, it will be apparent that the invention is capable of application to many other shapes of screws and lock washers without departing from the spirit and scope of the appended claims.

Having thus described my invention what I claim as new and desire to secure by Letters Patent is:

1. A screw and lock washer device comprising a screw having a head, a lock washer having a plurality of internal marginal twisted teeth adapted to lockingly engage the head of the screw, and means protruding from the body of the screw beyond the outer periphery thereof for retaining the lock washer in an operative position adjacent the screw head.

2. In combination with a screw having a head, an annular lock washer associated therewith having a plurality of internal twisted teeth for lockingly engaging the screw head and having an aperture of greater diameter than the diameter of the threaded portion of the screw, and a lateral protuberance on the screw over which the teeth may be sprung for retaining the washer in operative position adjacent the screw head, said protuberance extending beyond the outer periphery of the screw.

3. A screw and lock washer device comprising a screw having a frusto-conical head, an annular washer provided with a plurality of internal teeth twisted out of the plane of the washer stock for lockingly engaging said head, and a lateral protuberance provided along the line of juncture of the head and the threaded portion of the screw over which the washer teeth may be sprung for retaining the washer in an operative position adjacent the screw head, said protuberance extending beyond the periphery of the screw.

4. In combination with a screw formed with a frusto-conical head, said head being countersunk so as to present a marginal abutment extending beyond the screw periphery and a frusto-conical lock washer having a plurality of internal marginal twisted teeth for lockingly engaging the screw head, said abutment being designed to secure the lock washer against displacement and in operative position adjacent the peripheral surface of the screw head.

5. A fastener comprising a screw having a head and a lock washer fitting under said head, said screw having threads and having the head thereof formed with two tapers, the taper nearest the bottom of the head being less than the taper nearest the top of the head, the lock washer having a plurality of internal twisted teeth adapted to engage the lower portion of the screw head, and a body portion adapted to engage the upper portion of the screw head, the body and tooth portions of the lock washer being of uniform thickness.

In witness whereof, I have hereunto subscribed my name.

CARL G. OLSON.